United States Patent [19]

Imai et al.

[11] Patent Number: 5,515,737
[45] Date of Patent: May 14, 1996

[54] WEIGHING APPARATUS

[75] Inventors: Kenji Imai; Kazufumi Naito, both of Shiga, Japan

[73] Assignee: Ishida Co., Ltd., Kyoto, Japan

[21] Appl. No.: 436,496

[22] Filed: May 8, 1995

Related U.S. Application Data

[63] Continuation of Ser. No. 155,698, Nov. 23, 1993, abandoned.

[30] Foreign Application Priority Data

Dec. 3, 1992 [JP] Japan .................... 4-350587

[51] Int. Cl.$^6$ ........................................... G01G 3/14
[52] U.S. Cl. ........................... 73/862.623; 177/211
[58] Field of Search ................ 73/862.623, 862.627; 177/211

[56] References Cited

U.S. PATENT DOCUMENTS

| | | | |
|---|---|---|---|
| Re. 32,631 | 3/1988 | Layer | 177/211 |
| 3,845,657 | 11/1974 | Hall et al. | 73/88.5 R |
| 4,190,796 | 2/1980 | Ishii | 323/75 N |
| 4,276,442 | 6/1981 | Ienaka et al. | 179/1 A |
| 4,414,837 | 11/1983 | Bice et al. | 73/1 B |
| 4,862,710 | 9/1989 | Torita et al. | 68/12 R |
| 4,951,765 | 8/1990 | Naito et al. | 177/211 |
| 5,420,779 | 5/1995 | Payne | 363/56 |

Primary Examiner—Richard Chilcot
Assistant Examiner—Jewel V. Artis
Attorney, Agent, or Firm—Staas & Halsey

[57] ABSTRACT

To facilitate the adjustment of the accuracy and servicing maintenance of the electronic weighing apparatus, the weighing apparatus comprises a load cell and a signal processing circuit for processing a load signal from the load cell to provide a weight signal indicative of the load. The load cell includes a strain inducing element capable of producing strains in proportion to the load imposed thereon, and a bridge circuit, having a pair of strain gauges fixed on the stain inducing element and a plurality of resistors. A load signal is taken from a junction between the strain gauges and reference voltage signals are taken from junctions between the resistors. The load signal and the reference voltage signals are supplied to the signal processing circuit. If each of the strain gauges is employed in the form of a temperature compensating resistor having a characteristic effective to compensate for both of the temperature coefficient of thermal expansion of the strain inducing element and the temperature coefficient of the Young's modulus, the number of necessary component parts can be reduced.

10 Claims, 10 Drawing Sheets

WEIGHING APPARATUS

This application is a continuation of application Ser. No. 08/155,698, filed Nov. 23, 1993, now abandoned.

BACKGROUND OF THE INVENTION

1. Field of the Invention

The present invention relates to a weighing apparatus of a type utilizing a signal processing circuit for electrically processing a load signal outputted from a load cell so that the weight of an object to be weighed can be displayed by a display unit.

2. Description of the Prior Art

Some of the currently commercially available weighing apparatuses generally utilize such an electronic signal processing circuit as shown in FIG. 9. For the discussion of the prior art believed to be relevant to the present invention, reference will now be made to FIG. 9.

The prior art weighing apparatus shown in FIG. 9 comprises a load cell 30 electrically connected with circuits formed on a main circuit wiring board 31. The load cell 30 includes four strain gauges 32 each in the form of a resistance element mounted, or otherwise provided, on a strain inducing element (not shown) which produces strains in response to a load applied thereto as a result of placement of the object to be weighed. These strain gauges 32 are electrically connected with a flexible printed circuit board (not shown) so as to form a bridge circuit 33 of a full-bridge type. The flexible printed circuit board referred to above is coupled with the main circuit board 31 through a suitable connector (not shown). The strain gauge 32 generally employed in the prior art weighing apparatuses is of a type capable of compensating for a change of a coefficient of thermal expansion of the strain inducing element so that any possible measurement error resulting from a difference in coefficient of thermal expansion between the strain inducing element and the strain gauges can be eliminated.

Of four arms of the bridge circuit 33 having the respective strain gauges 32 disposed thereon, two arms connected together through a junction c include respective adjustment elements 34 for zero-point adjustment to be accomplished during a non-loaded condition of the weighing apparatus. In certain models, the adjustment element 34 is employed on all of the four arms of the bridge circuit. In either case, each of these adjustment elements 34 includes a zero-point adjusting (offset adjusting) resistor 35 in the form of a precise resistance element used to coordinate variations in resistance value among the strain gauge 32 to adjust an output from the bridge circuit 33 to a target level, for example, a zero volt, and a zero-point temperature characteristic compensating resistor 36 in the form of a temperature sensitive resistance element connected in series with the zero-point adjusting resistor 35 for compensating for a change of the output of the bridge circuit 33 from the target level as a result of a temperature dependent drift of the bridge circuit 33.

The bridge circuit 33 has input-side junctions a and b connected with respective span temperature characteristic compensating resistors 39 which are in turn connected with a direct current power source 38 that supplies an input voltage to the junctions a and b of the bridge circuit 33. Each of the span temperature characteristic compensating resistor 39 is in the form of a temperature sensitive resistance element and is utilized to compensate for an increase of the level of the load signal which would occur when the amount of strain increases as a result of a lowering of the Young's modulus of the strain inducing element with an increase of temperature.

A voltage between output-side junctions c and d of the bridge circuit 33 is supplied to a signal processing circuit 40 provided on the main circuit board 31. This signal processing circuit 40 employed in this prior art weighing apparatus includes a differential amplifier stage 41 for amplifying the load signal outputted from the load cell 30, an analog filter for removing a noise component from the toad signal which has been amplified by the differential amplifier stage 41, an analog-to-digital converter (ADC) 43 for converting the filtered load signal into a digital load signal, and a central processing unit (CPU) 44 for calculating a measured value representative of the weight of the object to be weighed based on the digital load signal supplied from the analog-to-digital converter 43 and also for providing a display unit with the measured value in the form of a weight signal capable of being displayed.

On the other hand, the direct current power source 38 is also connected with a first voltage divider circuit 46 for providing all component elements of the signal processing circuit 40 with a first reference voltage $V_{COM}$ and a second voltage divider circuit 47 for providing the analog-to-digital converter 43 with a second reference voltage $V_{REF}$ to cause the analog-to-digital converter 43 to determine the level of an input signal supplied thereto.

The circuit configuration shown in FIG. 9 makes use of a number of resistance elements in, for example, the four strain gauges 42 and the two voltage divider circuits 46 and 47 and, thus, the number of component parts employed therein is relatively great. Also, since the resistance of each of the strain gauges 32 of a kind employed in the weighing apparatus is generally relatively low, the bridge circuit 33 consumes a relatively large amount of electric power. Therefore, in the case of the weighing apparatus powered by a battery, the battery is apt to run out quickly.

In view of the problems discussed above, the use has been suggested of such a bridge circuit 33A as shown in FIG. 10. The bridge circuit 33A shown in FIG. 10 is so designed that a difference between a voltage appearing at the junction d between the strain gauges 32 and the first reference voltage $V_{COM}$ may be utilized as a load signal. This bridge circuit 33A has been considered advantageous in that, when each of the voltage divider circuits 46 and 47 is chosen to have a relatively high resistance, the amount of the electric power consumed by the bridge circuit 33A can be considerably reduced. However, this configuration of the bridge circuit 33A has been found having the following two problems.

In the first place, unless the span temperature characteristic compensating resistors 39 have the same resistance and the same temperature characteristic, the voltage at the junction d from which the load signal can be taken out fluctuates with change in temperature, that is, becomes unstable with change in temperature.

Secondly, since the level of the load signal is represented by a difference between the voltage at the junction d between the strain gauges 32 and the first reference voltage $V_{COM}$, it is necessary to compensate totally for the temperature characteristic of both of the voltage divider circuit 46 and the strain gauges 32 in order to obtain the load signal stable relative to the change in temperature. And, since the strain gauges 32 are fitted to the load cell 30 on one hand and, on the other hand, the voltage divider circuit 46 is fitted to the main circuit board 31, an adjustment necessary to compensate for temperature-dependent variation must be carried out while the load cell 30 and the main circuit board 31 are assembled together. Therefore, the adjustment tends to be complicated and time-consuming. In addition, since the load cell 30 and the main circuit board 31 once they have been adjusted in the assembled condition have no compatibility with any other load cell or main circuit board and must be employed always in a paired fashion in a particular weighing apparatus, a replacement of one of the load cell 30 and the main circuit board 31 requires a corresponding replacement of the other of the load cell 30 and the main circuit board 31. Thus, when one of the load cell and the main circuit board both employed in a particular weighing apparatus is required to be replaced, the both must be replaced with a pair of the load cell and the main circuit board which have been separately adjusted, resulting in a waste of component parts.

To substantially alleviate the foregoing two problems, the inventors of the present invention have suggested, in their U.S. Pat. No. 4,951,765, such a circuit configuration as shown in FIG. 11 in which the use of the span temperature characteristic compensating resistors 39 have been dispensed with. According to the circuit configuration shown in FIG. 11, the use has been made of a temperature sensitive resistor 39A for the purpose of automatically adjusting the gain of the differential amplifier stage 41 in accordance with change in temperature so that a change of the load signal due to the change in temperature can be compensated for by the automatic adjustment of the gain of the differential amplifier stage 41. The circuit configuration shown in FIG. 11 is effective to resolve the first mentioned problem associated with the load signal becoming unstable with change in temperature, but it has been found that the second mentioned problem associated with difficulty in adjustment and the waste of component parts remains unsolved.

SUMMARY OF THE INVENTION

In consideration of the problems discussed hereinbefore in connection with the prior art weighing apparatuses, the present invention has been devised to provide an improved weighing apparatus which does not substantially require a complicated and time-consuming adjustment to improve the weighing accuracy and can easily be serviced during a maintenance and, yet, which consumes a minimized amount of electric power.

To this end, the present invention provides a weighing apparatus which comprises a load cell for outputting a load signal in proportion to a load imposed thereon by the object to be weighed, a signal processing circuit for processing the load signal from the load cell to provide a weight signal indicative of the weight of the object to be weighed. The load cell includes a strain inducing element capable of inducing strains in response to application of the load imposed on the load cell, and a bridge circuit having first and second strain gauges and a series-connected circuit composed of a plurality of resistors. The signal processing circuit receives both of a load signal delivered from a junction between the first and second strain gauges and a reference voltage signal delivered from a junction between the resistors in the bridge circuit.

With this weighing apparatus, both of the load signal and the reference voltage signal are delivered from the bridge circuit formed on the side of the load cell and are in turn supplied to the signal processing circuit provided separately from the load cell. Since the resistors forming respective parts of the bridge circuit on the load cell concurrently serve as resistor for providing the reference voltage signal, the precision of both of the load signal and the reference voltage signal which considerably affects the weighing accuracy depends only on the precision of the bridge circuit. Accordingly, an adjustment required to secure the weighing accuracy can be simply accomplished by adjusting the bridge circuit on the load cell. Also, even where the load cell is desired to be replaced during the servicing job, a mere replacement with the adjusted load cell is sufficient to secure the weighing accuracy and, after the replacement, only a span adjustment in the signal processing circuit is required with no need to adjust the whole circuit including the bridge circuit on the load cell and the signal processing circuit.

Also, by choosing a higher resistance value for each of the resistors in the bridge circuit, the amount of electric power consumed by the bridge circuit can be minimized advantageously.

According to a preferred embodiment of the present invention, the signal processing circuit includes an amplifier means for amplifying the load signal, and a temperature compensating resistance means connected with the amplifier means. The temperature compensating resistance means has a characteristic effective to vary an amplification factor of the amplifier means with change in temperature to thereby compensate for a temperature coefficient of Young's modulus of the strain inducing element so as to suppress variation of a load signal outputted from the amplifier means with change in temperature. Accordingly, the load signal outputted from the amplifier means does not vary with change in temperature as the Young's modulus of the strain inducing element varies with change in temperature even though the level of the load signal varies with change in temperature, and accordingly, the weighing accuracy can be improved advantageously.

Also, according to another preferred embodiment of the present invention, each of the strain gauges may be in the form of a temperature compensating resistor capable of compensating for the temperature coefficient of the Young's modulus of the strain inducing element. In such case, the load signal outputted from the bridge circuit will not vary with change in temperature of the strain inducing element and, therefore, the weighing accuracy can be improved advantageously as well.

In a further preferred embodiment of the present invention, the bridge circuit includes an adjustment element connected in series with the series-connected circuit of the resistors or the strain gauges for adjusting an output from the bridge circuit. According to this embodiment, by adjusting or selecting the resistance value of the adjustment element, the zero-point adjustment of the bridge circuit is possible. The adjustment element may be connected in series with either the resistors or the strain gauges. Where variation in resistance is considerable among the strain gauges, the series connection of the adjustment element with the strain gauges may require such a complicated and time-consuming procedure of adjusting the resistance of each of the strain gauges or a calculation based on measurement of the resistance of each strain gauges in readiness for the selection of the adjustment element to be used for each bridge circuit. Accordingly, in such case, it is preferred that the adjustment element is connected in series with the resistors which can be manufactured with no considerable variation in resistance thereof.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
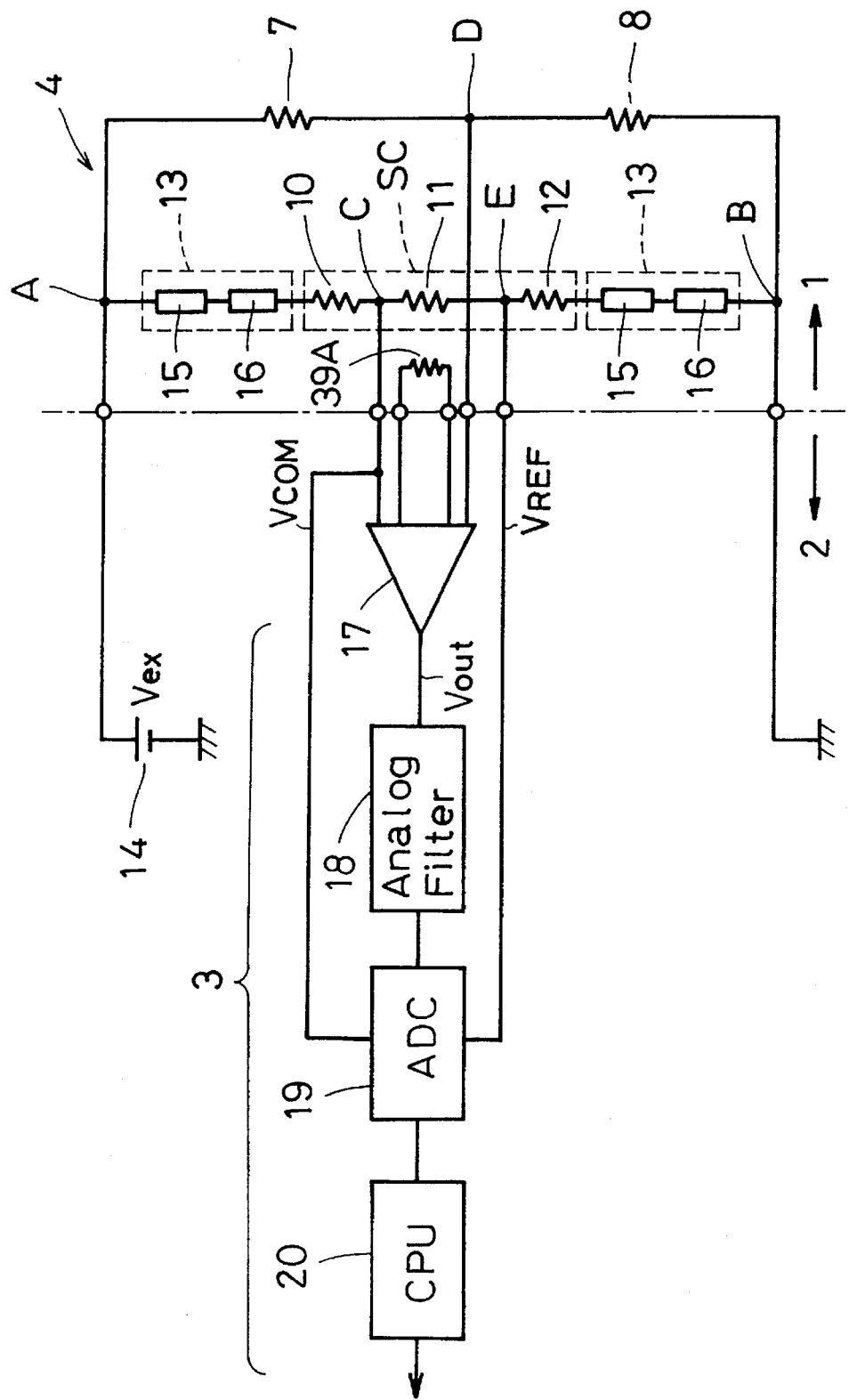
FIG. 1 is a block circuit diagram showing a weighing apparatus according to a first preferred embodiment of the present invention.
Figure 2:
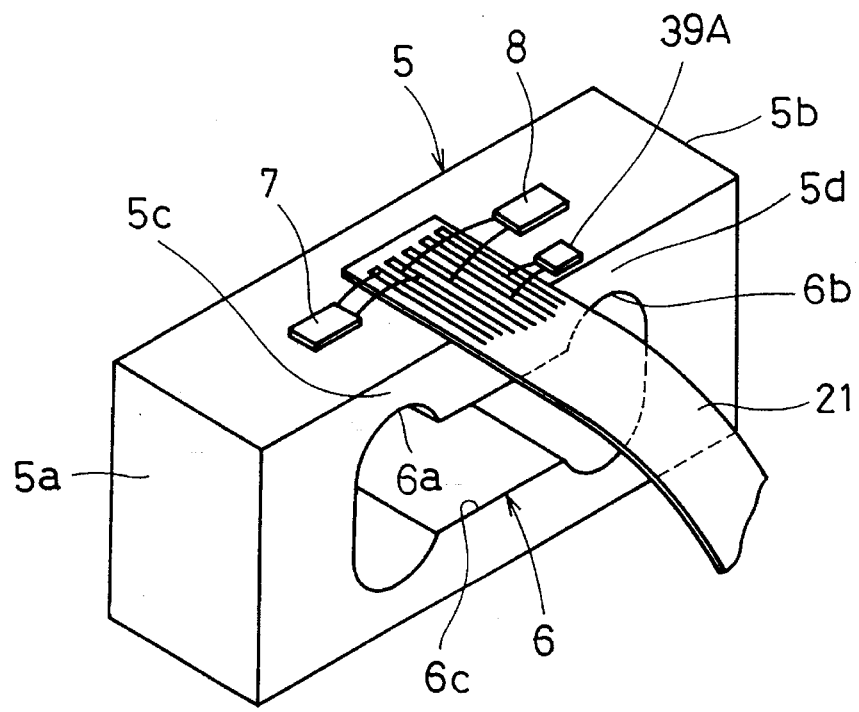
FIG. 2 is a schematic perspective view of a strain inducing element used in the weighing apparatus of the present invention.
Figure 3:
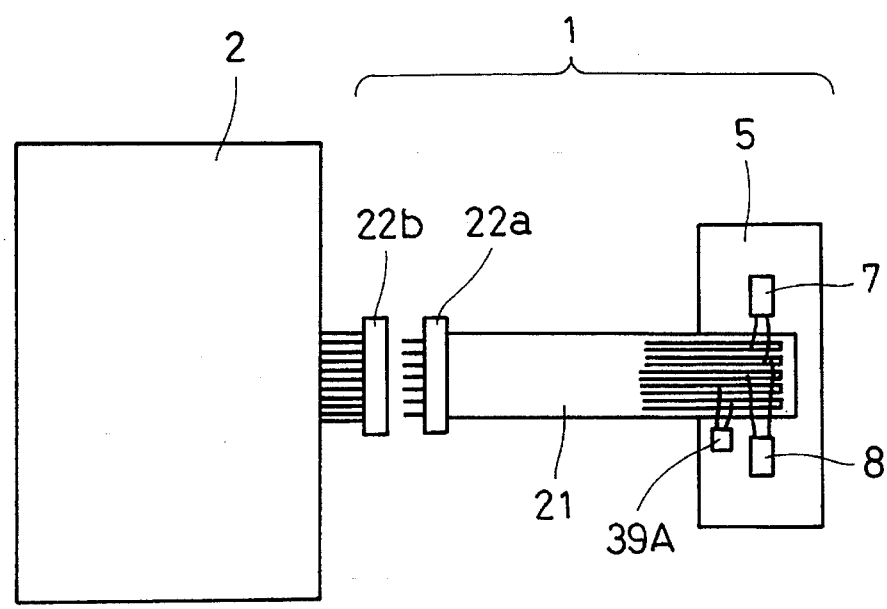
FIG. 3 is a schematic plan view showing a connection between two printed circuit boards employed in the weighing apparatus of the present invention.

Referring first to FIGS. 1 to 3, a weighing apparatus according to a first preferred embodiment of the present invention comprises a load cell 1 operable to output a load signal in response to application of a load imposed thereon, and a main printed circuit board 2. The main printed circuit board 2 includes a signal processing circuit 3 operable to electrically process the load signal, supplied from the load cell 1, to provide a measured weight signal indicative of the weight of an object to be weighed.

The load cell 1 includes a bridge circuit 4 and a strain inducing element 5 shown in FIG. 2, which element 5 is capable of producing strains in response to application of a load imposed by the object to be weighed. The strain inducing element 5 is of a structure comprising, as best shown in FIG. 2, a parallelepiped block having a generally elongated bore 6 that is defined by a pair of generally oval openings 6a and 6b positioned adjacent respective opposite ends of the parallelepiped block and a straight opening 6c communicating the oval openings 6a and 6b with each other. The parallelepiped block is so bored as to leave a fixed rigid portion 5a in one of the opposite ends, e.g., a left-hand end as viewed in FIG. 2, thereof and a movable rigid portion 5b in the other, i.e., right-hand, end thereof and also so as to leave upper and lower transverse beams 5c and 5d defined on respective sides of the bore 6 and connecting the fixed and movable rigid portions 5a and 5b together. Strain gauges 7 and 8 forming parts of the bridge circuit 4 are fixedly mounted exteriorly on notch regions 5e and 5f in the upper transverse beam 5c, each of said notch regions 5e and 5f being defined immediately above the respective oval opening 6a or 6b and corresponding in position to the most thin-walled portion of the upper transverse beam. Each strain gauges 7 and 8 may be of any known construction and therefore has operating characteristics standards to all of the strain gauges generally employed in a load cell for weighing apparatuses for compensating for a variation of a temperature-dependent coefficient of thermal expansion of the strain inducing element 5.

The bridge circuit 4 is formed on a flexible main printed circuit board 21 shown in FIGS. 2 and 3 and is electrically connected through connectors 22a and 22b with the signal processing circuit 3 formed on the main printed circuit board 2. The strain gauges 7 and 8 mounted on the strain inducing element 5 are connected on wirings formed on the flexible printed circuit board 21.

Figure 4A:
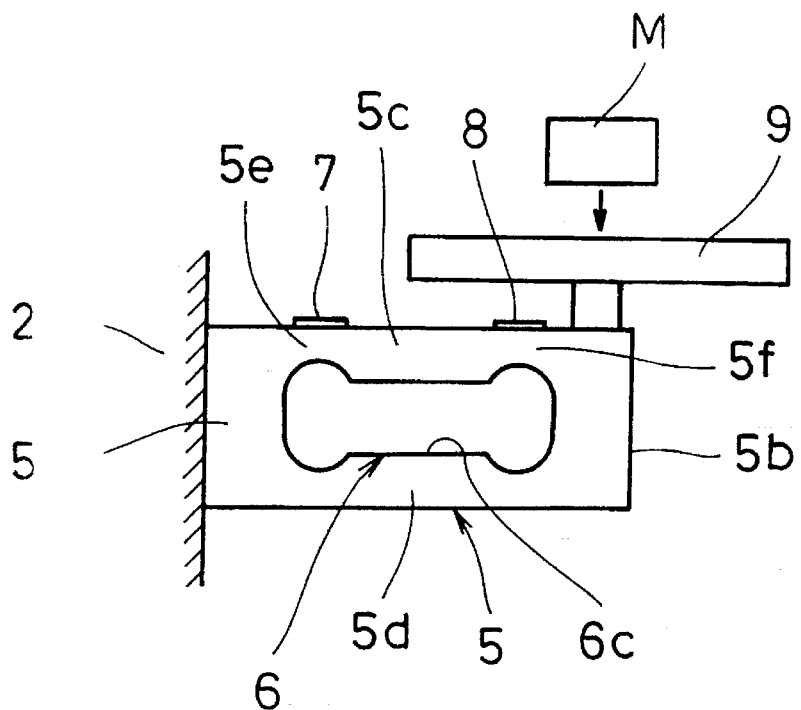
FIG. 4(a) is a schematic side view of the strain inducing element in a non-loaded condition.
Figure 4B:
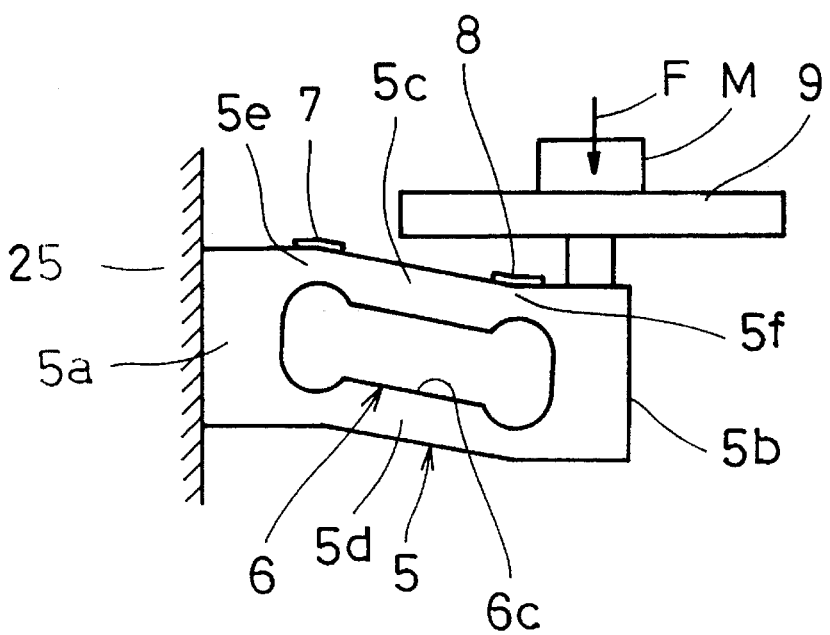
FIG. 4(b) is a schematic side view of the strain inducing element in a loaded condition.

As best shown in FIGS. 4(a) and 4(b), the strain inducing element 5 is supported with the fixed rigid portion 5a fixedly secured to a support framework 25 of the weighing apparatus while a weighing table 9 is mounted on the movable rigid portion 5b. Therefore, it will readily be understood that, when a load F, that is, the weight of the object M to be weighed, is placed on the weighing table 9, the strain inducing element 5 deforms having undergone a parallel motion in which the movable rigid portion 5b moves downwards relative and parallel to the fixed rigid portion 5a. As a result of the deformation of the strain including element 5 in the manner described previously, strains are induced in the strain gauges 7 and 8, accompanied by change in resistance of the strain gauges 7 and 8 in proportion to the amount of strains so induced. Based on the respective resistances of the strain gauges 7 and 8 which vary in proportion to the amount of the strains so induced, the bridge circuit 4 generates a load signal corresponding to the weight F of the object M to be weighed.

The signal processing circuit 3 formed on the main printed circuit board 2 and shown in FIG. 1 includes an amplifier stage 17 for amplifying the load signal supplied from the load cell 1, an analog filter 18 for removing a high frequency component of a frequency higher than a predetermined cut-off frequency from the load cell, that is, a vibration component attributable mainly to mechanical vibration of the load cell 1, an analog-to-digital converter (ADC) 19 of, for example, a double integrating type for converting the filtered analog load signal into a digital load signal, and a central processing unit (CPU) 20 for arithmetically processing the digital load signal to provide a weight signal which is indicative of the measured weight of the object to be weighed and which can be displayed by any known display unit (not shown).

The bridge circuit 4 includes, in addition to the strain gauges 7 and 8 referred to above, a series-connected circuit SC of first to third resistors 10, 11 and 12, each being in the form of an usual resistor having an extremely small temperature-dependent coefficient of resistance, and adjusting elements 13 connected with each other through the series-connected circuit SC of the first to third resistors 10 to 12 for adjusting an output of the bridge circuit 4. Specifically, a series-connected circuit of the strain gauges 7 and 8 and a series-connected circuit including the first to third resistors 10 to 12 and the adjusting elements 13 are connected parallel to each other between plus and ground poles of a direct current power source 14 capable of providing a bridge input voltage Vex. Accordingly, a junction D between the strain gauges 7 and 8 provides the load signal; a junction C between the first and second resistors 10 and 11 provides the a first reference voltage signal $V_{COM}$; and a junction E between the second resistor 11 and the third resistor 12 provides a second reference voltage signal $V_{REF}$. The first reference voltage signal $V_{COM}$ provides a reference voltage common to all component parts of the signal processing circuit 3 while the second reference voltage signal $V_{REF}$ is a reference voltage used by the analog-to-digital converter 19 in the signal processing circuit 3 to compare an input signal with it.

Each of the adjusting elements 13 disposed on two arms of the bridge circuit 4, that is, between a junction A and the first resistor 10 and between a junction B and the third resistor 12, respectively, is used for adjusting the load signal from the load cell 1 to a predetermined level or a zero-point level during a non-loaded condition of the weighing apparatus and comprises a zero-point adjusting resistor 15 and a zero-point temperature characteristic compensating resistor 16. The zero-point adjusting resistor 15 is in the form of a precise resistor having a small temperature coefficient enough to coordinate variations in resistance value between the strain gauges 7 and 8 to adjust an output from the bridge circuit 4 to the predetermined level, for example, a zero volt. On the other hand, the zero-point temperature characteristic compensating resistor 16 is in the form of a temperature sensitive resistance element for compensating for a deviation of the output of the bridge circuit 4 from the predetermined level as a result of a temperature dependent drift of the bridge circuit 4. Each of these compensating resistors 15 and 16 has a sufficiently low resistance as compared with that of any one of the first to third resistors 10 to 12.

The amplifier stage 17 of the signal processing circuit 3 is connected with a temperature compensating resistor 39A having its resistance variable with change in temperature to thereby vary the amplification factor of the amplifier stage 17. This temperature compensating resistor 39A has such a characteristic as to compensate for the temperature coefficient of the Young's modulus of the strain inducing element 5 to thereby suppress a temperature-dependent change of the load signal outputted from the amplifier stage 17.

In other words, the output voltage $V_{OUT}$ from the amplifier stage 17 is given by the following equation:

$$V_{OUT} = V \cdot G \quad (1)$$
$$= k \cdot \epsilon \cdot Vex \cdot G$$

wherein Vex represents the bridge input voltage; V represents a bridge output voltage, that is, a potential difference between a voltage at the junction D and the first reference voltage signal $V_{COM}$; k represents the gauge factor of the strain gauge; $\epsilon$ represents the amount of strain induced in the strain gauge; and G represents the amplification factor of the amplifier stage.

Figure 5A:
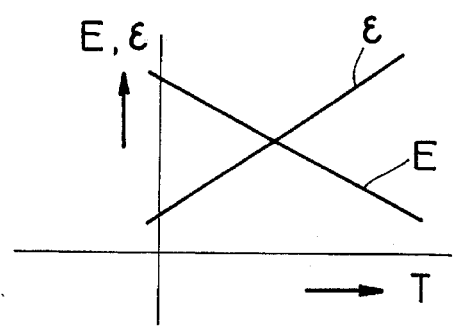
FIGS. 5(a) to 5(f) are graphs showing temperature compensating characteristics in the weighing apparatus of the present invention.
Figure 5B:
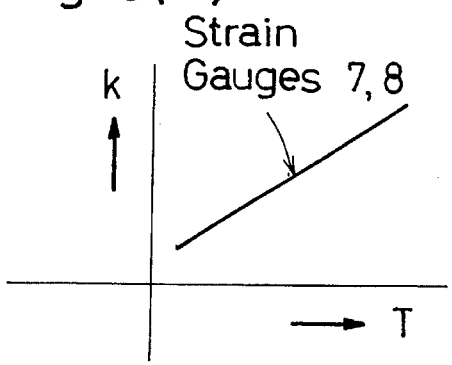
Figure 5C:
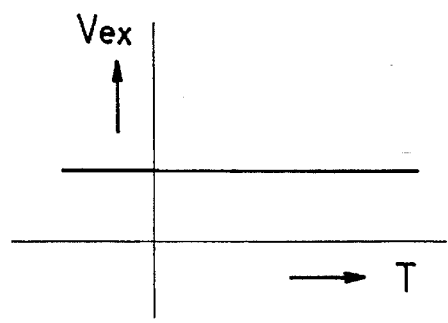
Figure 9:
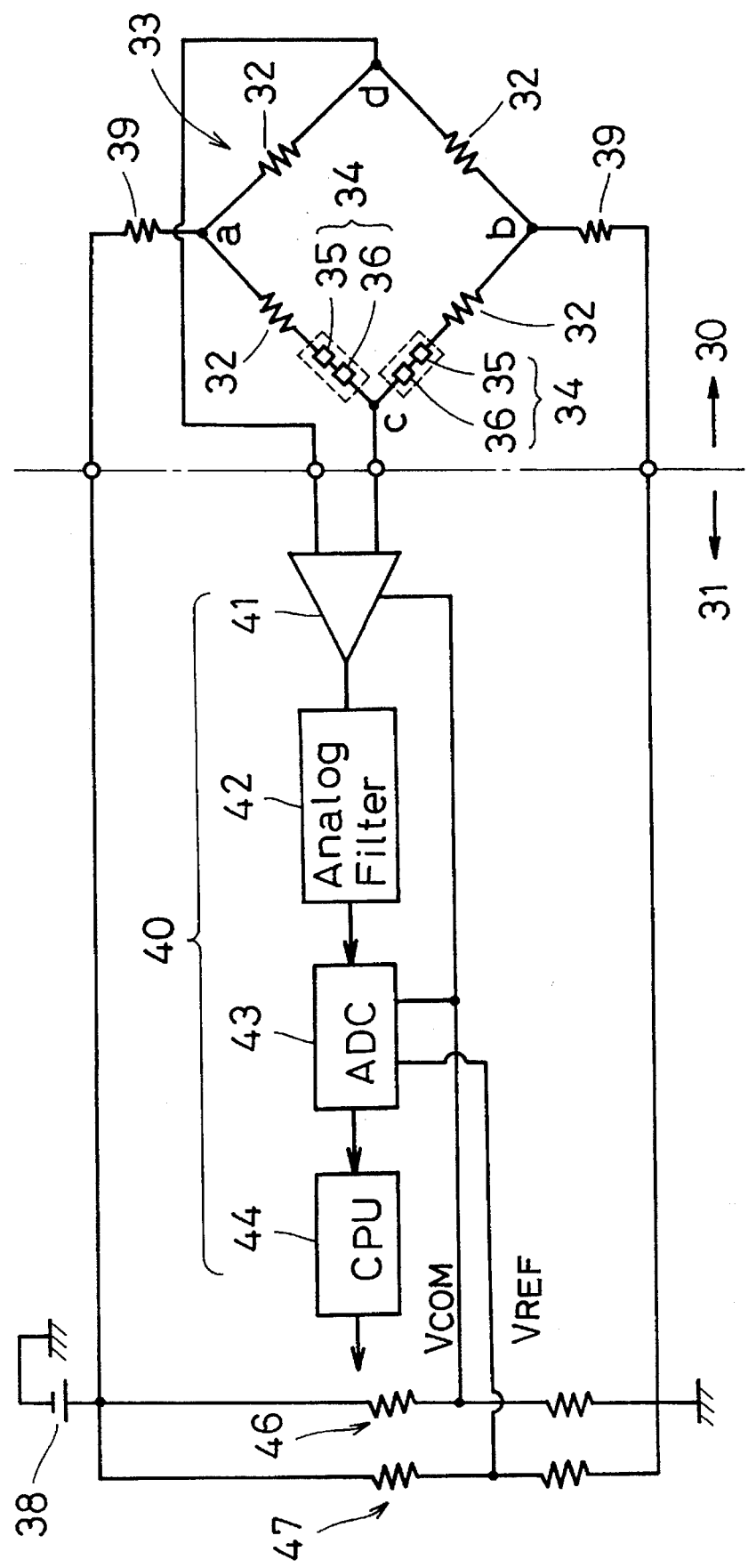
FIG. 9 is a block circuit diagram showing one of the prior art weighing apparatuses.

In general, the amount of strain $\epsilon$ induced in the strain gauge increases, as shown in FIG. 5(a), as the Young's modulus of the strain inducing element 5 lowers as a result of an increase of temperature. Also, the gauge factor k increases, as shown in FIG. 5(b), with increase of temperature. Accordingly, assuming that the input voltage Vex is fixed as shown in FIG. 5(c), the bridge output voltage V increases as a result of strains induced by an increase of temperature. Therefore, in the case of the prior art weighing apparatus employing the full bridge circuit 33 as shown in FIG. 9, the use has been made of the span temperature characteristic compensating resistors, each having a resistance tending to increase with increase of temperature, so that the input voltage Vex applied to the junctions a and b of the bridge circuit 33 can be lowered with increase of temperature to thereby compensate for the span temperature characteristic to maintain the output voltage $V_{OUT}$ at a constant value as shown in FIG. 5(e).

Figure 10:
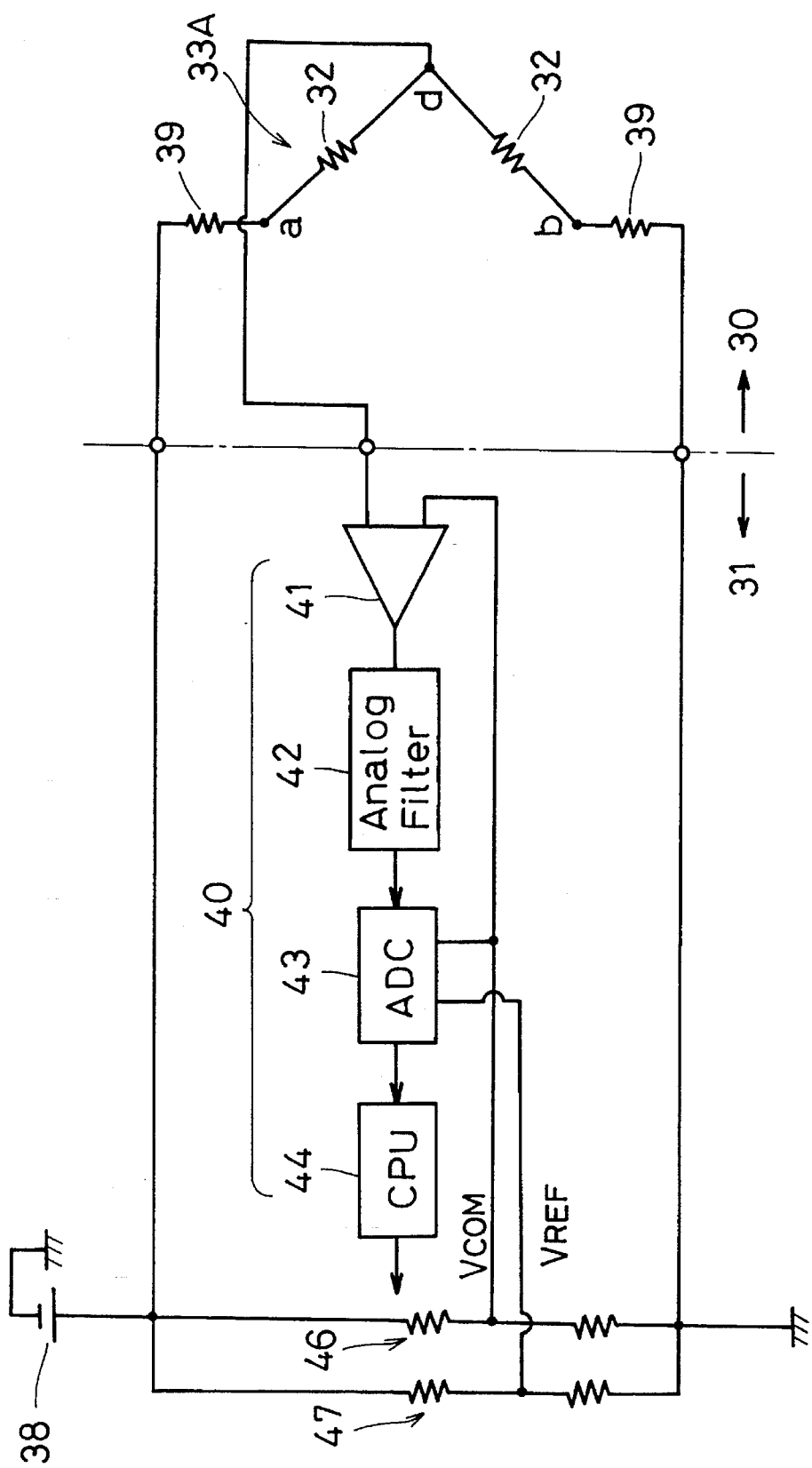
FIG. 10 is a block circuit diagram showing another one of the prior art weighing apparatuses.
Figure 11:
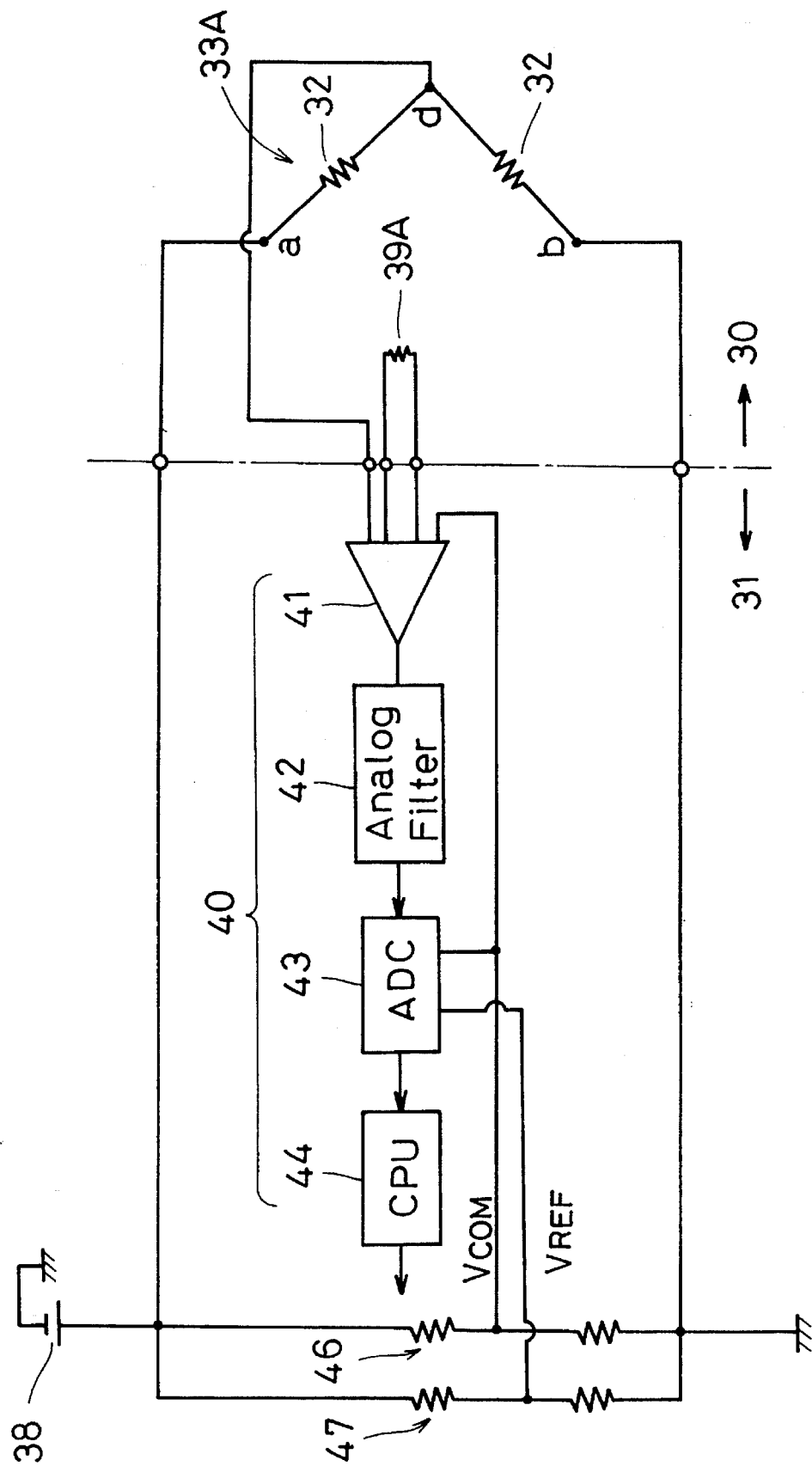
FIG. 11 is a block circuit diagram showing the other of the prior art weighing apparatus.

However, in the bridge circuit 4 employed in the present invention and corresponding in function to the half-bridge circuit 33A shown in any one of FIGS. 10 and 11, the use of the above mentioned span temperature characteristic compensating resistors 39 would result in the previously discussed problem in that the voltage at the junction D from which the load signal is taken out fluctuates with change in temperature unless the span temperature characteristic compensating resistors 39 have the same resistance and the same temperature characteristic with each other.

Figure 5D:
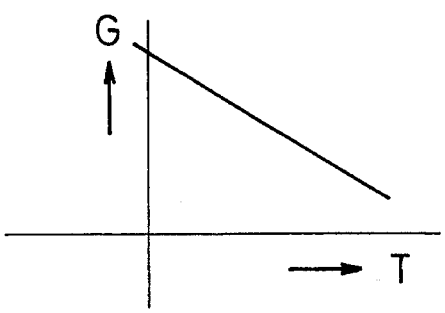
Figure 5E:
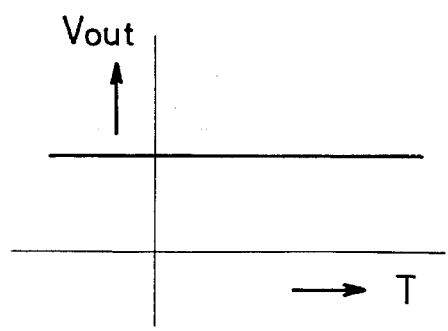

In view of the foregoing, in the practice of the first preferred embodiment of the present invention, the bridge input voltage Vex is fixed while the amplification factor G of the amplifier stage 17 is allowed to lower with increase of temperature as shown in FIG. 5(d). By so doing, the output voltage $V_{OUT}$ of the amplifier stage 17 could be maintained at a constant value as can readily be understood from the equation (1) quoted above.

Figure 6:
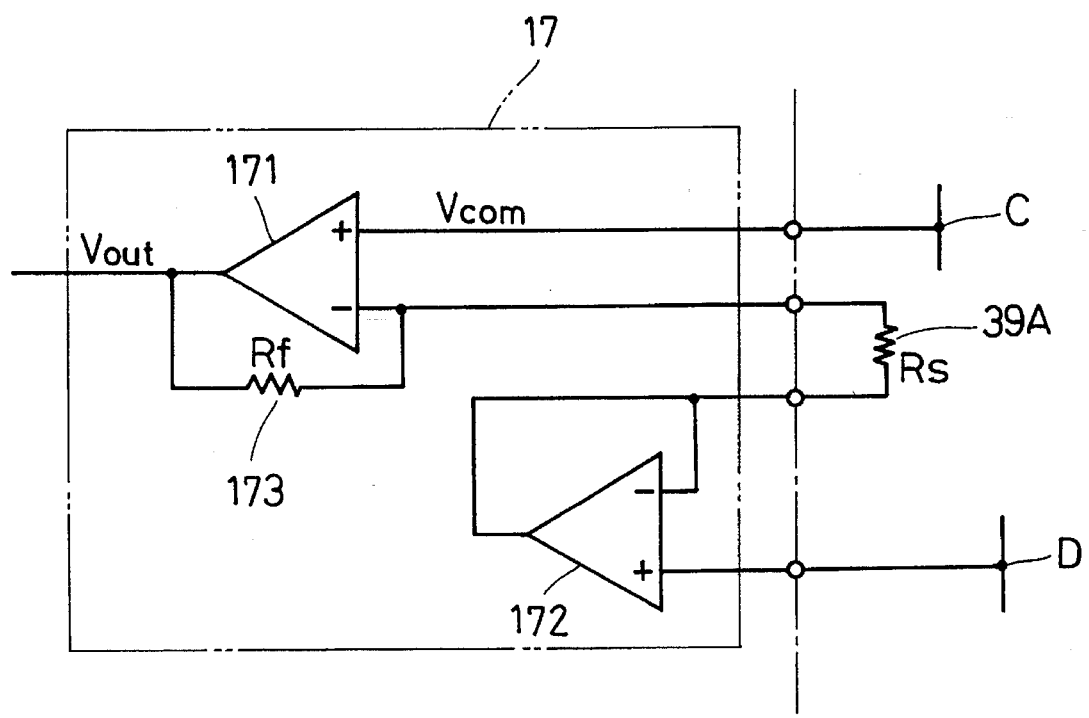
FIG. 6 is a block circuit diagram showing the details of a differential amplifier stage used in the circuit of FIG. 1.

An example of the amplifier stage 17 referred to above and which can be employed in the practice of the present invention is of a circuit configuration as shown in FIG. 6. Referring to FIG. 6, the amplifier stage 17 includes a negative feed-back amplifier 171 having a positive input terminal adapted to be fed with the first reference voltage signal $V_{COM}$ while the load signal appearing at the junction D of the bridge circuit 4 is fed to a negative input terminal of the negative feed-back amplifier 171 through a buffer 172 and the temperature compensating resistor 39A. The amplification factor G of the amplifier stage 17 of the above described circuit configuration has the following relationship with the resistance value Rf of a negative feed-back resistor 173 and the resistance value Rs of the temperature compensating resistor 39A:

$$G = Rf/Rs$$

Accordingly, by rendering the resistance value Rs of the temperature compensating resistor 39A to increase with increase in temperature of the temperature compensating resistor 39A, the amplification factor G increases with increase of the temperature and, thus, as shown in FIG. 5(e), the output voltage $V_{OUT}$ (span) of the amplifier stage 17 can be stabilized at a constant value relative to change in temperature.

The weighing apparatus of the construction described hereinbefore operates in the following manner.

Assuming that the input voltage from the direct current power source 14 is applied between the junctions A and B of the bridge circuit 4 of the load cell 1, a voltage generated between the junctions C and D of the bridge circuit 4 may be subsequently supplied to the amplifier stage 17 as a load signal. The amount of offset of the load signal from the load cell 1 during a non-loaded condition of the weighing apparatus is adjusted by the zero-point adjusting resistor 15 and the zero-point temperature characteristic compensating resistor 16 so as to attain the predetermined level without being adversely affected by a change in temperature, that is, so as to permit the output voltage difference between the junctions C and D to attain a predetermined value, for example, zero volt.

On the other hand, as the first reference voltage signal $V_{COM}$ common to all component parts of the signal processing circuit 3, a voltage appearing at the junction C of the bridge circuit 4 is supplied from the load cell 1 to the signal processing circuit 3 on the main printed circuit board 2. Also, as the second reference voltage signal $V_{REF}$ utilized by the analog-to-digital converter 19, a voltage appearing at the junction E of the bridge circuit 4 is inputted to the analog-to-digital converter 19. Partly because the difference between the first and second reference voltage signals $V_{COM}$ and $V_{REF}$ corresponds to a voltage between opposite ends of the resistor 11 and partly because each of the first to third resistors 10 to 12 has a resistance value sufficiently higher than the resistance value of any one of the adjusting elements 13 and also has an extremely small temperature-dependent coefficient of resistance, it is possible to supply the second reference voltage signal $V_{REF}$ which is stable relative to the first reference voltage signal $V_{COM}$ corresponding to a virtual ground voltage.

The analog load signal inputted to the amplifier stage 17 is amplified therein and subsequently passed through the analog filter 18 by which a high frequency component of the analog load signal is cut off. The analog load signal having been filtered through the analog filter 18 is then converted by the analog-to-digital converter 19 into a digital load signal which is subsequently supplied to the central processing unit 20. In response to receipt of the digital load signal, the central processing unit 20 performs a calculation to determine the weight of the object to be weighed and then outputs the weight signal to the display unit for providing a visual indication of the weight of the object so weighed.

In the weighing apparatus according to the present invention, the bridge circuit 4 in the load cell 1 is highly precisely assembled and, therefore, both of the first and second reference signals $V_{COM}$ and $V_{REF}$ and the load signal can be precisely controlled simultaneously. Also, the adjustment necessitated to secure the weighing accuracy can be carried out on the side of the load cell 1 independently of the circuit on the main printed circuit board 2.

Moreover, where the load cell 1 is required to be replaced during a servicing, a mere replacement with a similar, but adjusted load cell is sufficient to preserve the weighing accuracy and no adjustment other than the span adjustment in the central processing unit 20 is required.

Also, since the load cell 1 used in the weighing apparatus of the present invention employs the first to third resistors 10 to 12 connected in the bridge circuit 4, that is, the first to third resistors 10 to 12 may possibly correspond to a circuit in which the two voltage divider circuits 46 and 47 in any one of FIGS. 9 to 11 are integrated together, the number of resistors necessitated in the bridge circuit 4 can be reduced advantageously.

Yet, the provision of the temperature compensating resistor 39A connected with the amplifier stage 17 of the signal processing circuit 3 is effective to compensate for the temperature coefficient of the Young's modulus of the strain inducing element 5 so that any possible temperature-dependent variation of the load signal outputted from the amplifier stage 17 can be suppressed. Accordingly, the load signal outputted from the amplifier stage 17 is stable and will not fluctuate with change in temperature and, therefore, the weighing accuracy can be improved advantageously.

Furthermore, since the resistance value of each of the first to third resistors 10 to 12 forming respective parts of the bridge circuit 4 can be chosen to be of a high value regardless of the resistance value of any one of the strain gauges 7 and 8, the amount of the electric power consumed in the bridge circuit 4 can be advantageously minimized and, therefore, the present invention can be best used in a battery-powered weighing apparatus.

In the meantime, where during the manufacture of the strain gauges the strain gauges have considerably varying resistance values, and in order for the adjusting elements to be connected in series with the strain gauges, a complicated and time-consuming procedure may be required to measure the resistance value of each of the strain gauges 7 and 8, then to perform a calculation to determine the resistance value of each of the adjustment elements 13 in reference to the measured resistance values of the strain gauges 7 and 8, and finally to select the adjustment elements each having a resistance value equal to or approximating to the determined resistance value.

In contrast thereto, in the illustrated embodiment of the present invention, in the bridge circuit 4 the adjustment elements are connected in series with the first to third resistors 10 to 12 and a so-called fixed resistor, which has little variation in resistance among the fixed resistors, can be advantageously used for each of the first to third resistors 10 to 12. Therefore, once the adjustment elements, each being of a type having a resistance value chosen in consideration of the resistance value of each of the fixed resistors used for the first to third resistors 10 to 12, are employed in the practice of the present invention, identical adjustment elements can equally be employed in other similar bridge circuits 4. On the other hand, the strain gauges having considerably varying resistance values can be employed in the practice of the present invention. This brings about an improvement in workability and also a minimization of any possible reduction in characteristic of the strain gauges with passage of time.

In the foregoing embodiment of the present invention, the temperature compensating resistor 39A has been shown and described as mounted on the strain inducing element 5 of the load cell 1. This is particularly advantageous in that any possible change in temperature of the strain inducing element 5 can be transmitted directly to the temperature compensating resistor 39A. However, where the main printed circuit board 2 having the signal processing circuit 3 formed thereon is positioned in the vicinity of the strain inducing element 5, the temperature compensating resistor 39A may be mounted on the main printed circuit board 2 and, even in this alternative disposition, the temperature compensating resistor 39A can have its resistance value varying effectively with change in temperature of the strain inducing element 5.

Figure 7:
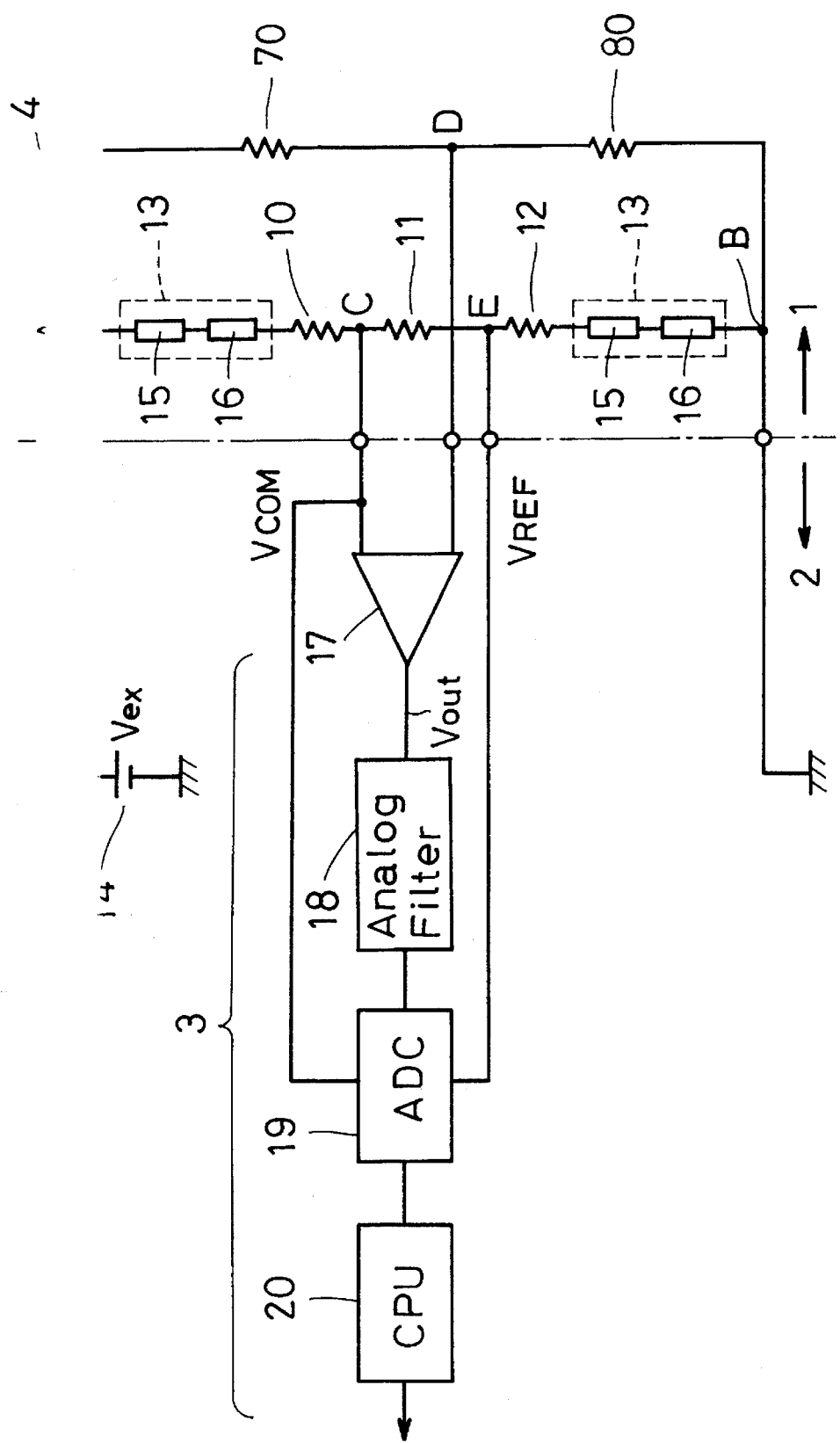
FIG. 7 is a block circuit diagram showing the weighing apparatus according to a second preferred embodiment of the present invention.

FIG. 7 illustrates a second preferred embodiment of the present invention. In this second preferred embodiment, the temperature compensating resistor 39A which has been described as employed in the foregoing embodiment of the present invention is dispensed with and, instead, the strain gauges, now indicated by 70 and 80, respectively, are employed each in the form of a temperature compensating resistor having a characteristic effective to compensate for the temperature coefficient of the Young's modulus of the strain inducing element.

Figure 5F:
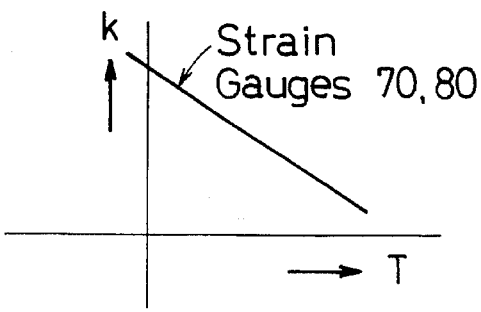

In other words, each of the strain gauges 70 and 80 has such a characteristic that the gauge factor k decreases with increase of the temperature T as shown in FIG. 5(f). On the other hand, as hereinbefore described, the strain $\epsilon$ increases, as shown in FIG. 5(a), as a result of reduction in Young's modulus E of the strain inducing element due to increase of the temperature T, thereby tending to increase the output voltage $V_{OUT}$. This increment of the output voltage $V_{OUT}$ is counterbalanced by the temperature characteristic of the gauge factor k and, consequently, as can readily be understood from the equation (1) discussed hereinbefore, even though the amplification factor G of the amplifier stage 17 remains constant regardless of the change of the temperature, a constant output voltage $V_{OUT}$ can be obtained as shown in FIG. 5(e) relative to the constant input voltage Vex shown in FIG. 5(c). Thus, the strain gauges 70 and 80 are of a type capable of counterbalancing change of the Young's modulus of the strain inducing element resulting from change in temperature, that is, of a type capable of compensating for the temperature coefficient of the Young's modulus. Each of the strain gauges 70 and 80 also has a usual operating characteristic of compensating for the temperature coefficient of thermal expansion which is generally found in standard strain gauges employed in the load cells for weighing apparatuses.

Each of the strain gauges 70 and 80 of a type capable of compensating for both the temperature coefficient of the Young's modulus of the strain inducing element and the temperature coefficient of thermal expansion of the strain inducing element can be employed in the form of a temperature compensating gauge prepared from a resistance element of, for example, a nickel-chromium alloy.

According to the foregoing second preferred embodiment of the present invention shown in and described with reference to FIG. 7, since the strain gauges 70 and 80 themselves have the characteristic of compensating for the temperature coefficient of the Young's modulus of the strain inducing element, the load signal outputted from the bridge circuit 4 is stabilized without being varied with change in temperature of the strain inducing element 5 and the weighing accuracy can therefore be increased.

Figure 8:
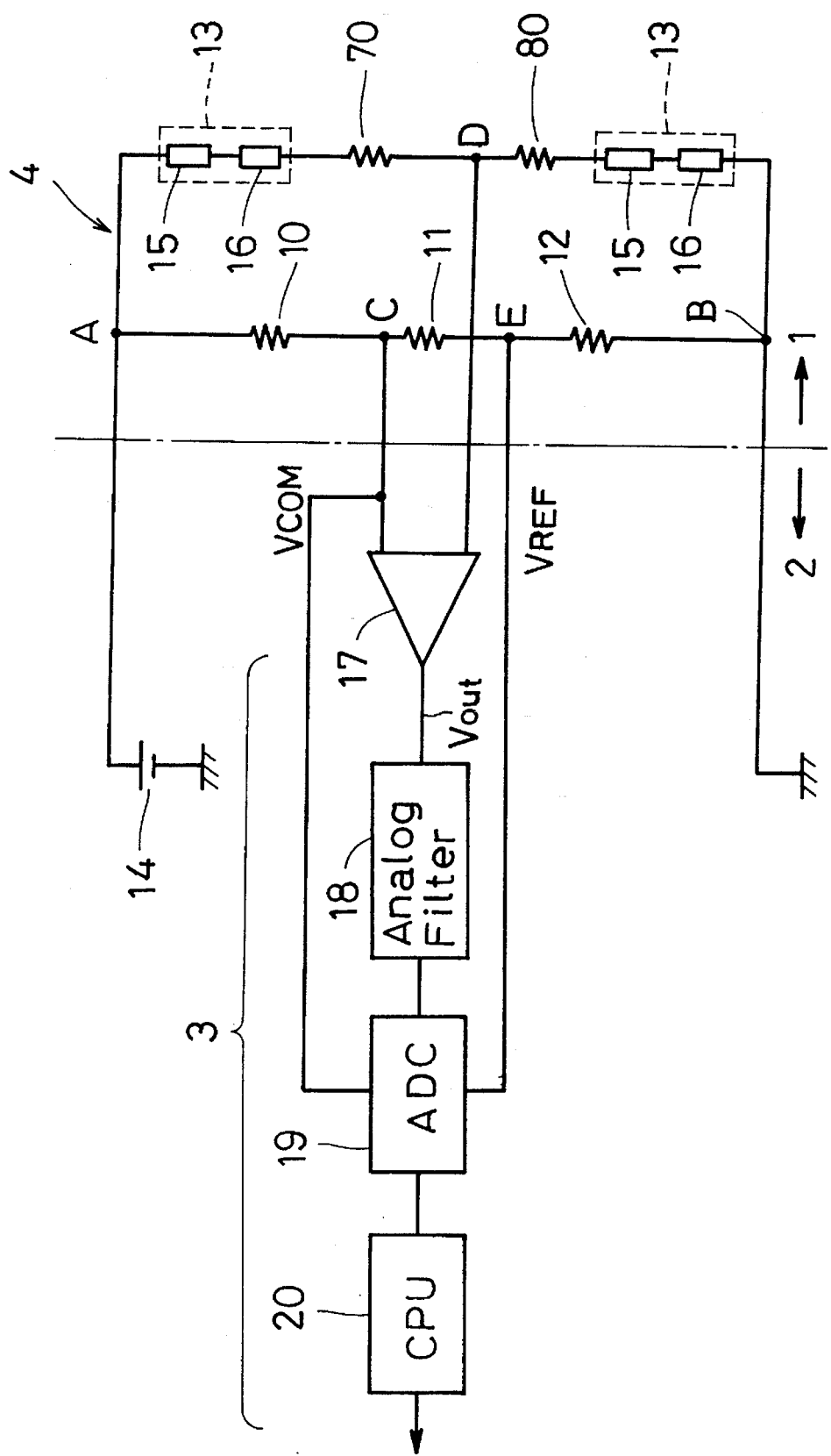
FIG. 8 is a block circuit diagram showing the weighing apparatus according to a third preferred embodiment of the present invention.

In describing any one of the foregoing preferred embodiments of the present invention, the bridge circuit 4 has been shown and described as having the adjustment elements connected in series with the first to third resistors 10 to 12. However, where variation in resistance of the strain gauges 7 and 8 is small, such a complicated and time-consuming procedure in selecting the adjustment elements is no longer required and, therefore, the adjustment elements 13 may be connected in series with the strain gauges 7 and 8 as shown in FIG. 8. Even with a third preferred embodiment of the present invention shown in FIG. 8, both of the zero-point adjustment and the zero-point temperature characteristic compensation of the bridge circuit 4 can efficiently and satisfactorily be accomplished by the adjustment elements 13.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in any one of the foregoing embodiments of the present invention, the bridge circuit 4 has been shown and described as having two strain gauges 7 and 8, or 70 and 80, on respective sides of the junction D, a plurality of strain gauges may be employed on each side of the junction D of the bridge circuit.

Accordingly, such changes and modifications are, unless they depart from the scope of the present invention as delivered from the claims annexed hereto, to be construed as included therein.

What is claimed is:

1. A weighing apparatus for measuring the weight of an object to be weighed by electrically processing the weight of the object, which apparatus comprises:

a load cell for outputting a load signal in proportion to a load imposed thereon by the object to be weighed; and a signal processing circuit, connected to the load cell, for processing the load signal from the load cell to provide a weight signal indicative of the weight of the object to be weighed, wherein:

said load cell includes a strain inducing element capable of inducing strains in response to application of the load imposed on the load cell, and a bridge circuit having first and second strain gauges and a series-connected circuit comprised of a plurality of resistors, said signal processing circuit receiving both of a load signal delivered from a junction between the first and second strain gauges and a reference voltage signal delivered from a junction between the resistors in the bridge circuit, and said signal processing circuit including an analog-to-digital converter for converting the load signal into a digital load signal, and receiving a second reference voltage indicative of the level of an input signal applied to the analog-to-digital converter.

2. The weighing apparatus as claimed in claim 1, wherein said signal processing circuit includes an amplifier means for amplifying the load signal, and a temperature compensating resistance means connected with said amplifier means, said temperature compensating resistance means having a characteristic effective to vary an amplification factor of the amplifier means with change in temperature to thereby compensate for a temperature coefficient of Young's modulus of the strain inducing element so as to suppress variation of a load signal outputted from the amplifier means with change in temperature.

3. The weighing apparatus as claimed in claim 2, wherein said temperature compensating resistance means is fitted to the load cell.

4. The weighing apparatus as claimed in claim 2, wherein said signal processing circuit is formed on a main printed circuit board and said temperature compensating resistance means is mounted on said main printed circuit board.

5. The weighing apparatus as claimed in claim 1, wherein each of said strain gauges is a temperature compensating resistor having a characteristic capable of compensating for a temperature coefficient of Young's modulus of the strain inducing element.

6. The weighing apparatus as claimed in claim 1, wherein said series-connected circuit includes first to third resistors, a junction between the first and second resistors providing a first reference voltage common to all elements of the signal processing circuit while a junction between the second and third resistors provides the second reference voltage determinative of the level of the input signal applied to the analog-to-digital converter, said first and second reference voltages being supplied to the signal processing circuit.

7. The weighing apparatus as claimed in claim 1, wherein said bridge circuit includes an adjustment element connected in series with the series-connected circuit of the resistors for adjusting an output from the bridge circuit.

8. The weighing apparatus as claimed in claim 1, wherein said bridge circuit includes an adjustment element connected in series with the strain gauges.

9. A weighing apparatus for measuring the weight of an object, comprising:

a load cell outputting the load signal in proportion to a load of an object; and a signal processing circuit processing the load signal from the load cell to provide a weight signal indicative of the weight of the object, wherein said load cell includes a bridge circuit having first and second strain gauges, and wherein said signal processing circuit receives both the load signal transmitted from a junction between the first and second strain gauges and a reference voltage signal transmitted from a junction between the resistors in the bridge circuit.

10. A weighing apparatus for measuring the weight of an object according to claim 9, wherein said bridge circuit further includes a series-connected circuit comprising a plurality of resistors.

* * * * *